United States Patent [19]

Ray-Chaudhuri et al.

[11] 3,962,159

[45] June 8, 1976

[54] GRAFT COPOLYMERS OF A POLYAMIDEAMINE SUBSTRATE AND STARCH, AND METHOD OF MAKING SAME

[75] Inventors: Dilip K. Ray-Chaudhuri, Somerville; Carmine P. Iovine, Somerset, both of N.J.

[73] Assignee: National Starch and Chemical Corporation, Bridgewater, N.J.

[22] Filed: Feb. 3, 1975

[21] Appl. No.: 546,520

[52] U.S. Cl. .................... 260/17.4 GC; 162/164 R; 162/175; 260/9
[51] Int. Cl.² ........................ C08L 3/02; C08L 3/04
[58] Field of Search ..................... 260/9, 17.4 GC; 162/164, 175

[56] References Cited
UNITED STATES PATENTS

| | | | |
|---|---|---|---|
| 2,926,116 | 2/1960 | Keim | 162/164 |
| 2,926,154 | 2/1960 | Keim | 260/9 |
| 3,058,873 | 10/1962 | Keim et al. | 162/164 |
| 3,159,612 | 12/1964 | Tsou et al. | 260/89.7 |
| 3,227,671 | 1/1966 | Keim | 260/29.2 |
| 3,250,664 | 5/1966 | Conte et al. | 162/164 |
| 3,442,754 | 5/1969 | Espy | 162/164 |
| 3,647,763 | 4/1972 | Stockman et al. | 260/78 |

*Primary Examiner*—Edward M. Woodberry

[57] ABSTRACT

Graft copolymers are prepared by condensing a polyamideamine substrate with starch under controlled reaction conditions. Aqueous solutions of the resulting graft copolymers function as superior wet strength additives in the paper making process.

10 Claims, No Drawings

GRAFT COPOLYMERS OF A POLYAMIDEAMINE SUBSTRATE AND STARCH, AND METHOD OF MAKING SAME

BACKGROUND OF THE INVENTION

1. Field of the Invention

This invention relates to novel copolymeric products containing starch and polyamideamine components, a method for the preparation thereof and a method for using the same. More specifically, the invention is directed to starch graft copolymers of starches and polyamideamines, their preparation and the use of these graft copolymers as wet-strength additives for paper.

2. Brief Description of the Prior Art

The use of and synthesis of cationic thermosetting resins formed by the reaction of a polyalkylene polyamine with dibasic acid reagent and the subsequent reaction of the intermediate product with epichlorohydrin or a similar chain extending agent is well known in the art. In certain instances, additional reactants are utilized in the preparation of the intermediate, such for example, as a lactone or alkyl acrylate or methacrylate ester or a lactam. The production of such resins in relatively high yields with good reaction efficiency is taught in U.S. Pat. Nos. 2,926,116; 2,926,154; 3,058,873; 3,159,612; 3,227,671; 3,250,664; 3,442,754 and 3,647,763. The resulting resins are particularly useful as wet strength additives in the paper making process; however, due to their relatively expensive production costs, their use is not widespread. Attempts to dilute the polyamideamine resins, such as by blending with starch, have heretofore proved fruitless due to the subsequent reduction in wet strength performance of the blended material.

There is thus a need in the art for a polyamideamine containing product which is both economically feasible and which exhibits the superior wet-strength performance of the pure chain-extended polyamideamine resin when employed in the paper-making process.

SUMMARY OF THE INVENTION

It has now been found that when the polyamideamine intermediate discussed above is combined with starch in the presence of a condensing agent, and under the specific reaction conditions disclosed herein, that a novel graft copolymer of the starch and polyamideamine will be produced with relatively high grafting efficiency. This finding is completely unexpected when one considers the relative reaction rates of the hydroxyl groups and the amine groups with the condensing agent, particularly in the light of the teachings of the prior art regarding the high efficiency rates of the polyamideamine condensation reactions. Thus, it would be expected in view of these teachings that the polyamideamine condensation reaction would proceed as the primary reaction accompanied by only a minimal formation of the graft copolymer.

It has also been found that when these novel graft copolymers are employed as wet strength additives in the manufacture of paper, they produce results comparable to those obtained when the polyamideamine condensation product alone is employed.

An additional feature of the present invention is that by proper choice of condensing agent, the resulting copolymer may be produced in the form of either a thermosetting or thermoplastic resin. The resulting graft copolymers, besides being useful as wet strength additives, have use as flocculents, retention aids and binders depending upon the choice of condensing agent.

The novel graft copolymers of the present invention comprise the condensation product obtained by the reaction of a polyamideamine substrate having a total amine to carboxylic equivalent ratio of 1.25:1 to 3.00:1 and a reduced viscosity in methanol at 1% weight by volume of 0.05 to 0.20 dl/gm. and a water dispersible starch in a weight ratio of starch to polyamideamine of 1:9 to 9:1 using a condensing reagent in an amount corresponding to 0.75 to 2.0 moles condensing reagent per equivalent of amine in the polyamideamine substrate.

In accordance with the present invention, these graft copolymers are prepared by introducing a combination of carefully selected and judiciously controlled process variables into a preparative procedure which comprises the condensation polymerization reaction of a polyalkylene polyamine with a dibasic reagent, preferably a dibasic acid or ester, and, if desired, certain optional reactants at 100° to 250°C. in order to produce the polyamideamine substrate previously described. The polyamideamine substrate is then condensed with the starch substrate at a total solids concentration of 5 to 60% and at a temperature of 40° to 100°C. until the reaction mixture at 5 to 30% solids has a Gardner viscosity in the range of B and U.

The thus produced polyamideamine-starch graft copolymers may be added to an aqueous suspension of cellulosic fibers in amounts of 0.01 to about 10%, based on the weight of the dry fibers, the intimately mixed dispersion then formed into a sheeted product and subsequently the contained graft copolymers cured to a water insoluble state in order to effect significant improvement in the wet strength properties of the resulting paper product.

DESCRIPTION OF THE PREFERRED EMBODIMENTS

Any water-dispersible starch derived from a plant source including corn, potato, sweet potato, wheat, rice, sago, tapioca, waxy maize, sorghum, high amylose corn, etc. may be employed as substrate material in the present invention. For highest grafting efficiency, it is preferred that the starch be employed in the form of a conversion product, such as those dextrins obtained by the hydrolytic action of acid and/or heat; oxidized starches prepared by treatment with oxidants such as sodium hypochlorite; fluidity or thin boiling starches prepared by enzyme conversion or by mild acid hydrolysis; and derivatized starches such as starch ethers and esters.

The polyamideamine substrates suitable for use in the graft copolymers are the water soluble polymers having a reduced specific viscosity in methanol at 1% weight by volume of 0.05 to 0.20 dl/gm. and a ratio of total amine equivalents to total carboxylic equivalents of 1.25:1 to 3.00:1.

The weight ratio of the starch substrate to the polyamideamine substrate may range from 1:9 to 9:1, and will preferably be within the range of 4:6 to 6:4.

Suitable polyamideamine substrates may be prepared using any conventional procedures which involve the following reactants:

a. at least one polyalkylene polyamine compound corresponding to the formula:

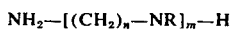

where *n* is an integer having a value of from 2 to 6 inclusive, R is H, —$CH_3$ or —$C_2H_5$ and *m* is an integer having a value of from 1 to 6 inclusive, b. at least one dibasic reagent, preferably selected from the group consisting of dibasic acids or esters of the formula:

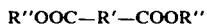

where R" is H or —$CH_3$ and R' corresponds to —$(CH_2)_p$— where *p* is an integer of from 2 to 9 inclusive, or

and c. optionally, at least one compound selected from the group consisting of:
i. alkyl lactams of the formula:

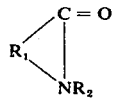

where $R_1$ is a divalent alkyl radical selected from the group consisting of aliphatic hydrocarbons containing from 3 to 12 carbon atoms and $R_2$ is H or an alkyl radical containing 1 to 6 carbon atoms;
ii. acrylic or methacrylic esters of the formula:

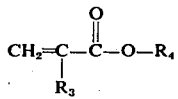

where $R_3$ is H or —$CH_3$ and $R_4$ is an alkyl radical having 1 to 4 carbon atoms; and
iii. beta-lactones of the formula:

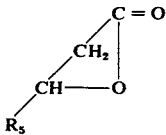

where $R_5$ is H or —$CH_3$.

Among the applicable compounds of class (a) would be: ethylenediamine, diethylenetriamine, bis-hexamethylenetriamine, triethylenetetraamine, tetraethylenepentamine, bis-(trimethylene)-triamine and hexamethylenediamine.

It is to be noted that more than one of the polyamines corresponding to the above formulae may be simultaneously utilized in the reaction system. Thus, if desired, the practitioner may utilize crude residues containing mixtures of amines, e.g. those resulting from the interaction between dichloroethane and ammonia, as the polyamine starting material for the novel process of this invention. It should be further noted that when the above depicted polyalkylene polyamine compound is one which contains two or more primary amine groups and the value of *m* exceeds about 5, it is highly likely that it will exhibit a branched configuration; such branched polyamines also are deemed readily applicable for use in the process of the invention.

Applicable compounds of class (b) include: adipic acid, dimethyl adipate, glutaric acid, dimethyl glutarate, succinic acid, dimethyl succinate, dimethyl terephthalate, dimethyl azelate and azelaic acid.

Applicable compounds of class (c) include: pyrrolidone, epsiloncaprolactam, valerolactam, methyl acrylate, ethyl acrylate, methyl methacrylate, butyl acrylate, beta-propriolactone and beta-butyrolactone.

It should be noted that more than one member of each class compounds of (a), (b) or (c) may be simultaneously utilized in the reaction system to produce the polyamide polyamine intermediate.

The weight proportions of polyalkylene polyamine reagent (a), the dibasic reagent (b), and the optional reagent (c) required to produce a polyamideamine substrate satisfactory for grafting are such that the ratio of total amine equivalents to total carboxylic equivalents will be in the range of 1.25:1 to 3.00:1, preferably 1.35:1 to 1.50:1. In order to calculate such a ratio, it is important to note that the lactam option does not contribute to the amine equivalents or carboxylic equivalents since the reaction between an amine and a lactam proceeds as follows:

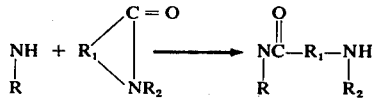

The acrylic or methacrylic ester (and correspondingly, the beta-lactone) optional reagents contribute only to the total carboxylic equivalents since the reaction proceeds as follows:

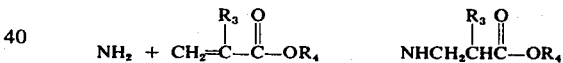

Thus, for example, a polyamideamine prepared from diethylene triamine (1.50 mole), ethylene diamine (0.5 mole), methylacrylate (0.5) mole and dimethylglutarate (1.75 mole) would have a total amine equivalent of 5.50 and a total carboxylic equivalent of 4.00 to give a ratio of 1.38:1, well within the range required for satisfactory grafting provided the substrate is also within the required reduced viscosity range.

Epichlorohydrin is the preferred condensing reagent, however other condensing agents which may be used are those known to react with both amines and alcohols under mildly alkaline conditions such as the halohydrins (e.g. epibromohydrin), 1,3-dichloropropanol, 1,2-dichloroethane, 1,4-dichloro-2-butene, divinyl sulfone, methylene bisacrylamide, glyoxal, divinylether and the like. The use of these reagents in the condensing of polyamideamines is well known to those skilled in the art.

The amount of condensing reagent used corresponds to 0.75 to 2.0 moles per equivalent of amine in the polyamideamine substrate and will preferably be 1.0 to 1.6 moles of condensing agent per amine equivalent in the polyamideamine substrate.

While the initial reaction to form the polyamideamine substrate may be carried out using a number of conventional procedures such as those disclosed in the previously mentioned patents, the following method is preferred.

The polyalkylene polyamine reagent and the dibasic acid or ester are slowly admixed in a carbon dioxide-free atmosphere, and thereafter heated at a temperature of from about 100° to 250°C. for a period of about ½ to 4 hours. This reaction may be carried out under a wide range of pressure conditions with suitable modifications as would be known to one skilled in the art. Generally, the pressure employed will not substantially exceed atmospheric pressure. The reaction is continued until the resulting intermediate exhibits a reduced specific viscosity (RSV) value of from about 0.05 to 0.20 dl/gm., preferably 0.10 to 0.15 dl/gm., the latter characteristic being determined on a 1% weight by volume polymer solution in methanol at 25°C. and being indicative of the molecular weight of the polymeric intermediate.

Where lactones, lactams or acrylate or methacrylate esters are included in the reaction, the procedure comprises slowly admixing in a carbon dioxide-free atmosphere, the polyalkylene amine reagent, water and either the lactone, lactam or ester, and thereafter heating the reaction mixture at a temperature of from about 30° to about 150°C., preferably from 50° to 100°C., for a period of about ½ to 3 hours. Needless to say, the duration of the reaction will depend on the reaction temperature which is utilized as well as on the specific nature of the reactants. Completion of the reaction can be determined by following the disappearance of either the lactone carbonyl absorption band, the ester unsaturation absorption band, or the lactam carbonyl absorption band on the infra-red spectra of the respective products. The reaction is continued within the prescribed temperature range until the reduced viscosity of the condensation product falls within the aforementioned range. After formation the polyamideamine is preferably diluted with water to a solids concentration of 40 to 70% by weight.

The second stage or condensation reaction involves the condensation of the polyamideamine of the first stage and a suitable starch substrate (which has previously been dispersed in water) in a weight ratio of starch to polyamideamine in the range of 1:9 to 9:1 with a condensing reagent in an amount corresponding to 0.75 to 2.0 moles condensing reagent per equivalent of amine in the polyamideamine. This reaction is carried out in water at a total solids concentration of from 5 to 60% by weight and at a temperature ranging from about 40° to 100°C. until the reaction mixture at 5 to 30% solids has a Gardner viscosity in the range of B and U, generally this viscosity will be obtained within a period of about 1 to 10 hours.

Optionally, the starch component may be dispersed in the presence of the polyamideamine component and additional water prior to condensing the two substrates as previously described.

Once the condensation reaction is completed, the graft copolymer is diluted with water to a solids range of 5 to 40% and stabilized at a pH of 4 to 6 by addition of any common mineral acid.

The exact structure of the graft copolymers of the present invention has not been precisely ascertained. It is believed, however, that when the reagents are used under the reaction conditions and within the proportional ranges disclosed herein, that reaction occurs between the amine functions and the hydroxyl groups at random positions along the chains of both the polymeric substrates, thus giving rise to the three dimensional complex graft copolymers at relatively high grafting efficiency.

As previously indicated, the graft copolymers prepared by the novel process of this invention may be prepared as either thermoplastic or thermosetting resins and as such function as excellent wet strength additives, flocculents, etc. in the paper making process depending upon the choice of condensing agents. Suitable condensing agents for use in the specific end use applications would be apparent to one skilled in the paper making art.

Furthermore, it is an advantage of the invention that these graft copolymers may be effectively utilized, in the paper making or external paper treating process, in conjunction with conventional paper additives such, for example as cellulosic derivatives, polyvinyl alcohol and gums, thereby resulting in the preparation of total paper products.

The graft copolymers of the present invention may be employed in any of the conventional methods of preparing paper sheets and other paper products. The preferred method for incorporating these graft copolymers whether they be in solution or dispersed form, is by internal addition to the cellulosic pulp material prior to the formation of the solid paper sheet. Thus, an aqueous solution of the graft copolymer may be added to an aqueous suspension of the paper stock while the latter is in the head box, beater, hydropulper, stock chest or at any other point in the paper making process prior to the point of sheet formation. Among the variety of pulps which may be effectively treated are included: bleached and unbleached sulfate (kraft), bleached and unbleached sulfite, bleached and unbleached soda, neutral sulfite, semi-chemical or chemigroundwood, hardwood or any combination of these fibers. These designations refer to wood pulp fibers which have been prepared by means of a variety of processes which are known in the paper and pulp industry. In addition, synthetic fibers of the viscose rayon, regenerated cellulose, polyamide or polyester type can also be used. It is a further advantage that the latter pulp slurries may be maintained over a wide range of pH levels, i.e. from about 4 to 11, and still be effectively treated by the graft copolymer of this invention.

Thereafter, the sheet is formed, pressed in order to reduce its moisture content and dried by conventional means, the latter drying operation serving to cure the copolymer to its polymerized and water-insoluble state. The curing procedure may be conducted under acidic, neutral or alkaline conditions, although such factors as optimum performance and minimum corrosion suggest that the curing step be conducted at pH levels ranging from about 6 to 9.

In practice, the graft copolymers are generally added to the pulp slurry in amounts ranging from about 0.01 to 10.0% based on the dry weight of the pulp. Within this preferred range, the precise amount will depend upon the type of pulp being used, the specific operating conditions, and the characteristics desired in the finished paper product.

The graft copolymers may also be applied to the finished paper stock by a variety of immersion and spraying techniques. Thus, for example, a paper sheet may be immersed in an aqueous solution of the copolymer, whereupon the treated sheet is cured by being heated at a temperature of about 40° to 150°C. for a period of about ½ to 180 minutes. The resulting paper sheets exhibit greatly increased wet strength properties and, thus, this procedure is especially well suited for the impregnation of paper towels, absorbant tissue, wrapping paper, bag paper and the like.

The following examples further illustrate the efficacy of the preferred embodiments of the invention. In these examples, all parts given are by weight unless otherwise noted.

EXAMPLE 1

This example illustrates the preparation of the polyamideamine from a polyalkylene polyamine and a dibasic ester.

A two liter reaction vessel equipped with a stainless steel mechanical agitator, thermometer, equalizer funnel, steel-packed 6 inch column and a distillation condenser with receiver was charged with 257.5 gms (2.50 moles) diethylenetriamine and 380.9 gms dimethyl glutarate (2.38 moles). The reaction mixture was heated with agitation over 1 hour to 125°–135°C. At 128°C. methanol began to distill. The temperature was maintained at 125°–135°C. for 2 ½ hours with a maximum vapor temperature of 69°C. To complete the polymerization, the reaction temperature was raised to 150°C. and held for 1 hour. At this time, the polymer melt was sampled for viscosity determinations. The reduced viscosity of the polymer at a 1% weight by volume solution in methanol was determined to be 0.113 dl/gm. The reaction mixture was cooled to 140°C. and terminated by adding 324 gms of distilled water to the melt over a period of 15 minutes.

The resulting polyamideamine solution had a solids content of 61.5% and an equivalent weight of 178 eq./dry gm. (dry basis). The distillate weight was 143.7 gms. (94.4% of theory).

EXAMPLE 2

This example illustrates the preparation of the polyamideamine from a polyalkylene polyamine, a dibasic ester and as the optional component, a lactam.

A reactor equipped as in Example I was charged with 207.6 gms. diethylenetriamine (2.02 moles) and 56.6 gms. epsilon-caprolactam (0.446 moles). The reaction mixture was heated with agitation over 1 hour to 100°C. and held at this temperature until the lactam was consumed. Thereafter, 320 gms. dimethyl glutarate (2.00 moles) was added to the reactor and the mixture heated to 125°–130°C. over 45 minutes. Distillation of methanol began at 130°C. The distillation was continued at 125°–130°C., with a maximum vapor temperature of 68°C. for a period of three hours. At this point, a sample of the solution was taken and the reduced viscosity (at 1% in methanol) was determined to be 0.112 dl/gm. The reaction was terminated by the addition of 393.6 gms. distilled water over a 15 minute period.

The polyamideamine solution had a solids content of 51.5% and an equivalent weight of 205.8 eq./dry gm. The distillate weight was 115 gms. (89.9% of theory).

EXAMPLES 3 –17

Using the procedures described in Example 1 and 2, other polyamideamine substrates were prepared as indicated in Table I.

Table I: Polyamideamines

| Example: | | 3 | 4 | 5 | 6 | 7 | 8 | 9 | 10 |
|---|---|---|---|---|---|---|---|---|---|
| Diethylenetriamine | (gms) | 154.5 | 154.5 | 194.4 | 194.4 | 206 | 206 | 194.4 | 194.4 |
| Ethylene diamine | (gms) | 30 | 30 | 37.5 | 37.5 | | 120 | 37.5 | |
| Bishexamethylenetriamine mix* | | | | | | | | | 136.3 |
| Hexamethylene diamine | (gms) | | | | | | | | |
| Tetraethylene pentamine | (gms) | | | | | | | | |
| E - Caprolactam | (gms) | 43 | 43 | 107.5 | 107.5 | 86 | 172 | 107.5 | 107.5 |
| Methacrylate | (gms) | | | | | | | | |
| Dimethyl glutarate | (gms) | 280 | 280 | 300 | 300 | 240 | 480 | 147.4 | 300 |
| Dimethyl adipate | (gms) | | | | | | | 81.2 | |
| Dimethyl succinate | (gms) | | | | | | | 72.2 | |
| Dimethyl azelate | (gms) | | | | | | | | |
| Dimethyl terephthalate | (gms) | | | | | | | | |
| Adipic acid | (gms) | | | | | | | | |
| Time to distillation | (hrs) | 2.5 | 2.5 | 2.75 | 3 | 1.5 | 2.5 | 2.25 | 3 |
| Temperature range - contents °C | | 116–33 | 116–22 | 120–27 | 116–20 | 118–25 | 120–30 | 120–30 | 120–30 | 125–35 |
| Time at reaction temperature (hrs.) | | 2.75 | 2 | 3 | 2 | 2 | 2.5 | 3.5 | 4 |
| Deionized water added | | | 310.5 | 310.5 | 392 | 392 | 270 | 481 | 320 | 385 |
| Reduced viscosity 1% MeOH dl/gm | | | 0.120 | 0.087 | 0.109 | 0.073 | 0.126 | 0.116 | 0.105 | 0.146 |
| % Solids | | | 53.4 | 53.5 | 53.1 | 51.6 | 58.4 | 58.4 | 59 | 58.6 |
| Equivalent wt. G/eq. dry basis | | | 230 | 211.7 | 219 | 207 | 197 | 284.5 | 204 | 280 |
| % Methanol recovered | | | 82.2 | 75.7 | 78 | 68 | 77.3 | 83.2 | 79.7 | 78.9 |
| % H₂O recovered | | | | | | | | | | |
| Amine/carboxyl ratio | | | 1.38 | 1.38 | 1.37 | 1.37 | 1.50 | 1.25 | 1.37 | 1.38 |

| Example: | | 11 | 12 | 13 | 14 | 15 | 16 | 17 |
|---|---|---|---|---|---|---|---|---|
| Diethylenetriamine | (gms) | 217.7 | 216 | 206 | 208.1 | 103 | 128.8 | |
| Ethylene diamine | (gms) | | | | | | | 5.6 |
| Bishexamethylenetriamine mix* | | 69.3 | | | | | | |
| Hexamethylene diamine | (gms) | | | | | | | 10.9 |
| Tetraethylene pentamine | (gms) | | | | | | | 113.5 |
| E - Caprolactam | (gms) | | | | | 127 | | |
| Methylacrylate | (gms) | 109.2 | | | | | | |
| Dimethyl glutarate | (gms) | 303.8 | | 262.4 | 240 | 179.8 | | |
| Dimethyl adipate | (gms) | | 348 | | | 149.4 | | 130.5 |
| Dimethyl succinate | (gms) | | | | | 3.3 | | |
| Dimethyl azelate | (gms) | | | 86.4 | | | | |
| Dimethyl terephthalate | (gms) | | | | 97.0 | | | |
| Adipic acid | (gms) | | | | | | 146 | |
| Time to distillation | (hrs) | 2.5 | 1 | 1 | 0.5 | 2 | 1 | 1 |
| Temperature range - contents °C | | 125–30 | 125–35 | 130–40 | 125–35 | 130–40 | 140–50 | 130–45 |
| Time at reaction temperature (hrs.) | | 3 | 4.25 | 3.50 | 1.75 | 3.5 | 3.0** | 3 |
| Deionized water added | | 358.6 | 333 | 282.8 | 278.2 | 398.1 | 294.3 | 126.5 |
| Reduced viscosity 1% MeOH dl/gm | | 0.116 | 0.127 | 0.137 | 0.101 | 0.127 | 0.075 | 0.109 |
| % Solids | | 58.3 | 57.6 | 59.2 | 61.7 | 52.5 | 55.8 | 63.8 |

Table I: Polyamideamines-continued

| | | | | | | | |
|---|---|---|---|---|---|---|---|
| Equivalent wt. G/eq. dry basis | 239 | 192.4 | 206 | 209 | 232 | 176.5 | 208 |
| % Methanol recovered | 73.2 | 88.1 | 90.2 | 88.8 | 89.8 | | 79.8 |
| % H$_2$O recovered | | | | | | 88* | |
| Amine/carboxyl ratio | 1.38 | 1.57 | 1.47 | 1.52 | 1.50 | 1.87 | 2.7 |

*includes higher homologs of bishexamethylenetriamine and some unreactive diluents.
**1 hour at 200 mm. Hg.

EXAMPLE 18

This example represents a typical graft co-polymer preparation in accordance with the present invention.

A 500 ml. flask equipped with a mechanical stirrer, thermometer, and condenser with acid trap was charged with 77.3 gms. of distilled water and 45.2 gms. of an acid converted waxy maize starch having a water fluidity of 83 and a moisture content of 11.5%. The temperature of the starch slurry was raised to 95°–100°C. and held for ½ hour to completely disperse the starch. After this time, the solution was cooled to 35°C. and 97.6 gms. of the polyamideamine solution of Example 1 (61.5% solids) was added. When the mixture was homogeneous, 46.8 gms. of 2,3-epoxy-1-chlorpropane was slowly added over a 30 minute period. The reaction was exothermic and external cooling was required to maintain the temperature at 25°–30°C. When the slow addition was complete, the reaction mixture was heated over 15 minutes to 40°C. and maintained at this temperature for 3 hours. The reaction mixture was then heated to 60°–65° C. and held at this temperature for 2 hours until the Gardner viscosity of the mixture at 30% solids was L. The reaction was terminated by dilution with 100.1 gms. distilled water and the pH adjusted to 4.5 with 5.4 gms. of 50% nitric acid.

EXAMPLE 19

A 500 ml. flask equipped with a mechanical stirrer, thermometer and condenser with acid trap was charged with 57.3 gms. distilled water. With agitation 55 gms. of a diethylaminoethylated waxy-maize starch having a water fluidity of 85 and a moisture content of 9.1% was slowly sifted into the flask. After dispersing the starch at 95°–100°C. for ½ hour, the solution was cooled to 30°C. and 97.1 gms. of the polyamideamine solution of Example 2 (51.5% solids) was added. After a suitable mixing period to assure homogeneity, 33.7 gms. of 2,3-epoxy-1-chloropropane was slowly added over a 30 minute period at 25°–30°C. with cooling. The mixture was heated to 40°C. and held at this temperature for 3 hours. After this time, the reaction mixture was heated to 50°–55°C. and held at this temperature for 2 hours, during which time the pH of the mixture dropped to 7.6 (indicative of condensation). The reaction was terminated by dilution with 91.1 parts of water and cooling to room temperature. The Gardner viscosity of a 30% solids solution of the polymeric mixture as termination was K. The polymer solution was thereafter adjusted to pH 4.5 by the addition of 10 gms. of 50 % nitric acid. The grafting efficiency of this system was determined to be 70% by extraction of the polymer with methanol.

EXAMPLES 20–36

Using procedures similar to those described in Examples 18 and 19, other graft copolymers were prepared as indicated in Table II. It is to be noted that where epichlorohydrin was employed as the condensing reagent, thermosetting copolymers were produced, while the use of 1,2-dichloroethane resulted in the formation of copolymers which were thermoplastic in nature.

EXAMPLE 37

Several of the graft copolymers prepared in Examples 18 – 36 were tested as wet strength additives for paper according to the following procedure.

TABLE II: GRAFT COPOLYMERS

| Example: | 20 | 21 | 22 | 23 | 24 | 25 | 26 | 27 | 28 |
|---|---|---|---|---|---|---|---|---|---|
| Starch type* | D | B | B | B | B | B | B | B | C |
| Starch % solids | 88.2 | 83.8 | 83.8 | 83.8 | 89.5 | 88.5 | 89.5 | 90.9 | 89.0 |
| Water, gms. | 138.9 | 151.0 | 139.5 | 64.1 | 151.0 | 145 | 70.0 | 54.5 | 56.1 |
| Starch, gms. | 84.3 | 83.8 | 67.0 | 25.2 | 83.8 | 85 | 66.0 | 44.0 | 56.2 |
| Polyamideamine Ex. Number | 6 | 3 | 3 | 3 | 4 | 6 | 5 | 2 | 2 |
| Polyamideamine gms. | 150 | 140.2 | 168.5 | 98.3 | 140.2 | 145 | 113 | 116.5 | 97.1 |
| Epichlorohydrin, gms. | 35.8 | 45.3 | 54.2 | 31.7 | 42.7 | 50.4 | 38 | 40.5 | 33.7 |
| 1,2-Dichloroethane, gms. | | | | | | | | | |
| Hours at 40–45°C. | 2 | 2 | 2 | 2 | 2 | 2 | 2 | 3 | 3 |
| Hours at 50–55°C. | | | | | | | | 3 | |
| Hours at 60–70°C. | 1.5 | 1.5 | 1 | 1 | 1 | 1 | 1 | | 1 |
| Dilution water, gms. | 54.5 | 68 | 81.3 | 47.5 | 88.3 | 50.4 | 60.9 | 95.7 | 91.2 |
| 50% HNO$_3$, gms. | 6.1 | 6.6 | 9.0 | 5.0 | 7.0 | 3.6 | 12.0 | 8.0 | 7.7 |
| Final Gardner Viscosity | J-K | C-D | D-E | E | C | D | F | K | M |
| pH before acidification | 5.8 | 6.4 | 6.8 | 7.0 | 6.4 | 7.1 | 7.6 | 7.9 | 8.0 |

| Example: | 29 | 30 | 31 | 32 | 33 | 34 | 35 | 36 |
|---|---|---|---|---|---|---|---|---|
| Starch type* | A | A | B | A | A | B | B | A |
| Starch % solids | 88.5 | 88.5 | 89.4 | 88.5 | 88.5 | 90.9 | 90.9 | 88.5 |
| Water, gms. | 55.8 | 75.9 | 67.9 | 67.2 | 67.9 | 59.0 | 57.7 | 53.3 |
| Starch, gms. | 56.5 | 56.5 | 67.1 | 67.8 | 84.7 | 44.0 | 44 | 45.2 |
| Polyamideamine Ex. Number | 2 | 1 | 1 | 1 | 1 | 8 | 10 | 1 |
| Polyamideamine gms. | 97.1 | 81.3 | 65.0 | 65 | 40.6 | 102.7 | 107 | 116.5 |
| Epichlorohydrin, gms. | 33.7 | 39.0 | | | | 29.2 | 32.9 | 40.5 |
| 1,2-Dichloroethane, gms. | | | 22.2 | 22.2 | 13.9 | | | |
| Hours at 40–45°C. | 3 | 3 | 3 | 3 | 3 | 2 | 2 | 3 |
| Hours at 50–55°C. | 1.5 | | | | | | | |
| Hours at 60–70°C. | | 1½ | 2.5 | 2 | 2 | 2 | 1 | 0.75 |
| Dilution water, gms. | 91.5 | 94.8 | 83.3 | 83.3 | 172.6 | 88.1 | 90.7 | 95.8 |
| 50% HNO$_3$, gms. | 6.5 | 4.7 | | | | 7.3 | 8.3 | 6.7 |
| Final Gardner Viscosity | J | F | | | | J | G | H |

TABLE II: GRAFT COPOLYMERS-continued

| | | | | | |
|---|---|---|---|---|---|
| pH before acidification | 8.4 | 7.8 | 7.0 | 7.6 | 8.2 |

*Starch Type
  A. Acid converted waxy maize, water fluidity = 83
  B. Hydrolyzed waxy maize, diethylaminoethyl ether, water fluidity = 85
  C. Hydrolyzed corn starch, 2-hydroxyethylether
  D. Oxidized corn starch, borax fluidity = 7

The specified concentration of the graft copolymer solution was admixed with 3000 ml. of an aqueous slurry of a beaten unbleached sulfate pulp which had been adjusted to a consistency of 0.5% by weight and which was at a pH level of 7.5. Paper sheets whose dimensions were 12 inches × 12 inches were then prepared from each of the slurries utilizing the Williams standard Sheet Mold. The resulting sheets were squeezed in a press which applied a pressure of 2000 lbs. per square inch for a period of 8 to 10 minutes. A portion of each sheet was then cured at a temperature of 100°C. for one hour.

Sections of both the cured and uncured paper sheets, which were ½ inches wide and 6 inches long, were immersed in water for a period of 30 minutes, these sections serving as the wet strength test specimens. Strips ½ inches in width were then cut from the various specimens and were subjected to a pulling force of 2 inches per minute on an Instron Tensile Tester in order to measure the force necessary to tear the paper specimens.

Results were also obtained for paper sheets containing Kymene 557, a commercially available chain extended polyamideamine resin. Paper sheets containing no resin were also tested as described above to serve as a "Control" sample. The results of all these determinations are presented in Table III.

EXAMPLE 38

The following experiment was performed in order to show the effectiveness of the graft copolymers of the present invention over: (a) physical blending of starch and a chain extended polyamideamine; and (b) the chain-extended polyamideamine itself.

TABLE III

| Copolymer of Example No. | % of Resin based on dry wt. of pulp | Dry strength lbs/½ inch Uncured | Dry strength lbs/½ inch Cured | Wet strength lbs/½ inch Uncured | Wet strength lbs/½ inch Cured |
|---|---|---|---|---|---|
| 19 | 0.5 | 19.9 | 21.1 | 3.42 | 5.98 |
|  | 0.25 | 20.0 | 19.3 | 2.16 | 4.25 |
| 27 | 0.50 | 16.1 | 19.0 | 3.42 | 4.86 |
|  | 0.25 | 16.5 | 19.0 | 1.74 | 3.92 |
| 29 | 0.50 | 19.2 | 19.1 | 3.46 | 5.52 |
|  | 0.25 | 20.6 | 22.8 | 1.88 | 4.20 |
| 30 | 0.50 | 19.2 | 21.4 | 3.18 | 5.77 |
|  | 0.25 | 17.4 | 19.3 | 2.20 | 3.59 |
| 18 | 0.50 | 17.7 | 20.1 | 3.73 | 6.08 |
|  | 0.25 | 18.5 | 22.5 | 2.28 | 4.22 |
| 36 | 0.50 | 19.9 | 22.0 | 3.85 | 5.89 |
|  | 0.25 | 17.2 | 21.2 | 1.68 | 3.56 |
| Commercial wet strength rsin (Kymene 557) | 0.50 | 17.2 | 20.3 | 2.84 | 5.52 |
|  | 0.25 | 16.5 | 19.1 | 1.46 | 3.40 |
| Control (no resin) | — | 17.5 | 20.3 | 0.14 | 0.30 |

A chain-extended polyamideamine was prepared by condensing the polyamideamine with epichlorohydrin as follows: a 250 ml. flask equipped with a mechanical agitator, thermometer, condenser with acid trap and an equalized dropping funnel was charged with 16.8 parts distilled water and 50 parts of the polyamideamine of Example 3. To this mixture at 22°C., 16.8 parts epichlorohydrin were added over a 25 minute period. The exothermic reaction was maintained at 40°–45°C. for two hours. Thereafter, the mixture was maintained at 65°–70°C. for an additional two hours, during which time the Gardner Viscosity of the mixture rose to K. The reaction mixture was diluted with 40.7 parts of distilled water, cooled and acidified to pH 4.0 with 3 gms. of 50% nitric acid. This chain-extended polyamideamine had a solids content of 22.46%.

Sample A was prepared by physically blending 60% by weight of this chain-extended polyamideamine with 40% by weight of the hydrolyzed waxy maize starch used in Example 22.

Sample B was prepared using only the chain-extended polyamideamine.

Using the procedures described in Example 36, the wet strength properties of papers prepared using the polyamideamines of Samples A and B were compared with the properties of papers prepared using the graft copolymer of Example 22 as well as with a control to which no resin was added. The results are shown in Table IV.

TABLE IV

| Example | % of Resin on Pulp | Dry strength lbs/½ inch Uncured | Dry strength lbs/½ inch Cured | Wet strength lbs/½ inch Uncured | Wet strength lbs/½ inch Cured |
|---|---|---|---|---|---|
| Graft copolymers of Example 22 | 0.50 | 22.6 | 22.5 | 2.21 | 6.10 |
|  | 0.25 | 18.6 | 21.2 | 1.53 | 3.40 |
| Sample A Physical blend | 0.50 | 19.7 | 19.9 | 2.03 | 3.97 |
|  | 0.25 | 17.6 | 17.8 | 0.90 | 2.35 |
| Sample B Polyamideamine resin | 0.50 | 17.9 | 21.9 | 2.37 | 5.13 |
|  | 0.25 | 20.0 | 20.3 | 1.36 | 3.71 |
| Control - no resin | — | 16.4 | 17.6 | 0.10 | 0.33 |

It is apparent from these results that the graft copolymers of the present invention function as effectively as wet strength resins as the chain-extended polyamideamine resin which has not been diluted.

Now that the preferred embodiments of the present invention have been described in detail, various modifications and improvements thereon will become readily apparent to those skilled in the art. Accordingly, the spirit and scope of the present invention is to be considered as defined not by the foregoing disclosure, but only by the appended claims.

We claim:

1. A graft copolymer comprising the condensation product obtained by the reaction of:
   a. a polyamideamine substrate having a total amine to carboxylic equivalent ratio of 1.25:1 to 3.00:1 and a reduced viscosity in methanol at 1% weight by volume of 0.05 to 0.20 dl/gm., said polyamideamine substrate comprising the reaction product of a polyalkylene polyamine, a dibasic reagent and optionally at least one member selected from the group consisting of alkyl lactams, acrylic and methacrylic esters and beta-lactones,
   b. a water dispersible starch, and
   c. a condensing reagent selected from the group consisting of epichlorohydrin, epibromohydrin, 1,3-dichloropropanol, 1,2-dichloroethane, 1,4-dichloro-2-butene, divinyl sulfone, methylene bisacrylamide, glyoxal and divinyl ether, wherein the weight ratio of starch to polyamideamine is within the range of 1:9 to 9:1 and the amount of condensing reagent corresponds to 0.75 to 2.0 moles per equivalent of amine in the polyamideamine substrate.

2. The graft copolymer of claim 1 wherein the starch is in the form of a conversion product of a natural starch.

3. the graft copolymer of claim 1 wherein the starch is selected from the group consisting of dextrins, oxidized, thin boiling and ether or ester derivatives of starch.

4. The graft copolymer of claim 1 wherein the polyamideamine substrate comprises the reaction product of
   I. a polyalkylene polyamine corresponding to the formula

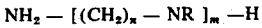

wherein R is H, —$CH_3$, or —$CH_2CH_3$, $n$ is an integer of from 2 to 6, and m is an integer of from 1 to 6;
   II. a dibasic reagent of the formula
   R"OOC —R'— COOR"
   wherein R' is $(CH_2)_p$ and $p$ is an integer of from 2 to 9, or

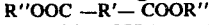

and R" is H or —$CH_3$; and optionally
   III. at least one member selected from the group consisting of
   i. alkyl lactams of the formula

wherein $R_1$ is a divalent alkyl radical selected from the group consisting of aliphatic hydrocarbons containing 3 to 12 carbon atoms, and $R_2$ is H or an alkyl radical of 1 to 6 carbon atoms,
   ii. acrylic or methacrylic esters of the formula

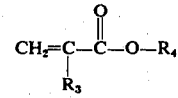

wherein $R_3$ is H or —$CH_3$, and $R_4$ is an alkyl radical of 1 to 4 carbon atoms, and (iii) beta-lactones of the formula

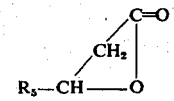

wherein $R_5$ is H or —$CH_3$.

5. The graft copolymer of claim 1 wherein the ratio of starch to polyamideamine is within the range of 4:6 to 6:4.

6. The graft copolymer of claim 1 wherein the ratio of total amine to carboxylic equivalents is within the range of 1.35:1 to 1.50:1

7. The graft copolymer of claim 4 wherein the condensing reagent is epichlorohydrin or 1,2-dichloroethane, and is used in an amount of 1.0 to 1.6 moles per amine equivalent in the polyamideamine substrate.

8. The graft copolymer of claim 1 wherein the condensing reagent is used in an amount of 1.0 to 1.6 moles per amine equivalent in the polyamideamine substrate.

9. A process for the production of a graft copolymer comprising the steps of:
   a. reacting a polyalkylene polyamine with a dibasic reagent at a temperature ranging from 100° to 250°C. in an amount sufficient to supply a total amine to carboxylic equivalent ratio of 1.25 to 3.0 for a time period sufficient to attain a reduced specific viscosity in methanol at 1% weight by volume of 0.05 to 0.20 dl/gm.,
   b. Condensing the polyamideamine thus formed with an aqueous dispersion of a starch substrate at a total solids concentration of 5 to 60% and a temperature of 40° to 100°C. until the reaction mixture at 5 to 30% solids has a Gardner viscosity in the range of B and U, wherein the weight ratio of starch substrate to polyamideamine substrate is in the range of 1:9 to 9:1 and the amount of condensing reagent corresponds to 0.75 to 2.0 moles per equivalent of amine in the polyamideamine substrate.

10. The process of claim 9 wherein the polyalkylene polyamine and dibasic reagent of (a) are additionally reacted with at least one member selected from the group consisting of alkyl lactams, acrylic and methacrylic esters and betalactones

* * * * *